United States Patent
Brozek

[11] 3,877,734
[45] Apr. 15, 1975

[54] ADAPTER FOR CONNECTING SPIRALLY FORMED TUBING TO ANOTHER CONDUIT

[75] Inventor: Chester W. Brozek, Chicago, Ill.

[73] Assignee: Chicago Fittings Corporation, Broadview, Ill.

[22] Filed: May 3, 1974

[21] Appl. No.: 466,676

[52] U.S. Cl. .............................. 285/249; 285/251
[51] Int. Cl. ............................................ F16l 33/00
[58] Field of Search ....... 285/15, 45, 249, 133, 138, 285/341, 340, 354, 251, DIG. 4

[56] References Cited
UNITED STATES PATENTS

| | | | |
|---|---|---|---|
| 1,933,769 | 11/1933 | Steele | 285/251 X |
| 2,226,039 | 12/1940 | Wiltse | 285/341 X |
| 3,078,109 | 2/1963 | Jackson et al. | 285/251 |
| 3,129,022 | 4/1964 | Avery | 285/249 |
| 3,244,438 | 4/1966 | Bucheit | 285/15 |
| 3,472,532 | 10/1969 | Leopold, Jr. et al. | 285/354 X |
| 3,700,268 | 10/1962 | Nielsen, Jr. | 285/249 X |

*Primary Examiner*—Andrew V. Kundrat
*Attorney, Agent, or Firm*—Gomer W. Walters

[57] ABSTRACT

An adapter for connecting a spirally formed tubing, such as a protective shield for a flexible gas line located therein, to an appropriate conduit, such as the inlet fitting of a gas meter, is provided. A strong interconnection between the gas meter and the flexible gas line is achieved by utilizing a linking member that is forcibly restrained in the adapter and is provided with an extending threaded portion, the threads of which engage the spirals of the tubing. An adhesive may be utilized between the linking member and the tubing to further strengthen the bond.

6 Claims, 3 Drawing Figures

PATENTED APR 15 1975 3,877,734

ADAPTER FOR CONNECTING SPIRALLY FORMED TUBING TO ANOTHER CONDUIT

BACKGROUND OF THE INVENTION

1. Field of the Invention

This invention relates generally to an adapter for attaching a flexible line to a fixed conduit, and more specifically, this invention relates to an adapter connecting a flexible gas conveying line having a spirally formed tubular shield to a gas meter.

2. Description of the Prior Art

In making a connection between a gas line and a gas meter, it is necessary to provide an adapter from the flexible gas conveying line to the pipe fitting that acts as a conduit to the meter. As the flexible gas conveying line must extend from its placement underground to the meter, which is above the ground, it means that the connection between the flexible gas conveying line and the meter is made in a vertical plane, as it is desirable to keep as little of the flexible gas conveying line above ground as possible. Even with this limited amount of flexible gas conveying line above ground, there is still the danger of the conduit being cut or otherwise damaged, with a consequent loss of gas and the ensuing problems and dangers. In addition, the vertical connection that is required for adaptation of the flexible gas conveying line to the meter presents the problem of preventing the flexible conduit from being pulled from the adapter, such as by settling of the ground surrounding the gas line or other downward forces.

To protect the flexible gas line, a spirally wound tubing of metal, usually covered with a protective covering of plastic, such as polyvinylchloride (PVC) may be utilized. This spirally wound tubular shield also faces the problem of achieving a sufficient bond to the adapter to prevent separation therefrom. In the past, this has been achieved by utilization of a compression nut arrangement in combination with a brass ferrule. While this arrangement has met the standard requirements and has performed adequately in service, there have been some difficulties in obtaining a sufficient safety factor in the strength of the bond between the tubular shield and the rest of the adapter. In addition, the compression applied to the tubular shield can result in distortion thereof, with the attendant disadvantages of weakening the bond and perhaps exposing the metal of the tubular shield to the elements.

SUMMARY OF THE INVENTION

The present invention obviates the difficulties of the prior art adapters by providing an arrangement which yields a very strong bond between the spirally formed tubular shield and the adapter (and hence the meter). In the embodiment of the invention disclosed herein, a joining arrangement releasably engages the meter fitting or other conduit, such as by a threaded interconnection, and connects the flexible gas or fluid conveying line to the conduit. This joining arrangement includes a steel nipple which is threaded to engage the threads of the gas meter fitting. The other side of the nipple has a compression flange, which is threaded to engage a threaded nut. A compression member, such as a yieldable material with a rigid holding member is located between the compression flange and compression nut, so that upon mating of the threads of the compression flange and compression nut the rigid holding member forcibly engages the flexible gas conveying line. Inasmuch as this flexible line will tend to distort under the compression force, a stiffener is located inside the flexible gas conveying line. This stiffener is formed with notches opposite the rigid holding member, so that as the rigid holding member is forced into engagement with the gas conveying line, this flexible material is pushed into the notches to form a binding connection.

The joining arrangement is fastened to a linking member by means of a connecting arrangement. The connecting arrangement includes a threaded connecting flange extending from the compression nut, the threads of which are adapted to mate with the threads of a connecting nut.

In order to form a strong bond between the spirally wound tubing and the adapter, the linking member is provided with an extended portion that has threads to engage the spirals of the spirally formed tubular shield. In order to further strengthen this bond, an adhesive may be placed between the threads of the linking member and the spirals of the tubular shield. In order to maintain the linking member in fixed engagement with the adapter, a head portion is formed on the linking member. This head portion is located between the compression nut and the connecting nut, so that mating of the threads of the connecting flange and connecting nut result in the linking member being forcibly restrained in association with the adapter between the compression nut and the connecting nut.

With the arrangements disclosed herein, a very strong engagement or bond is formed between the adapter and a spirally wound tubing, such as the tubular shield for a flexible gas conveying line. With particular reference to the environment of connecting such a flexible gas conveying line to a gas meter, a strength well above that required by the gas companies for the connection between the tubular shield and the gas meter is achieved. Thus, the flexible gas conveying line is protected from forces that tend to separate the gas line from the meter, such as settling of the ground, because the tubular shield with its very strong bond to the adapter absorbs these forces. As a result, an adapter is provided which greatly increases the effective strength of the bond between the gas conveying line and the gas meter, as well as insuring that the tubular shield protecting the gas conveying line from damage remains in place.

These and other objects, advantages and features of this invention will hereinafter appear, and for purposes of illustration, but not of limitation, an exemplary embodiment of the subject invention is shown in the appended drawing.

DETAILED DESCRIPTION OF THE PREFERRED EMBODIMENT

Figure 1:
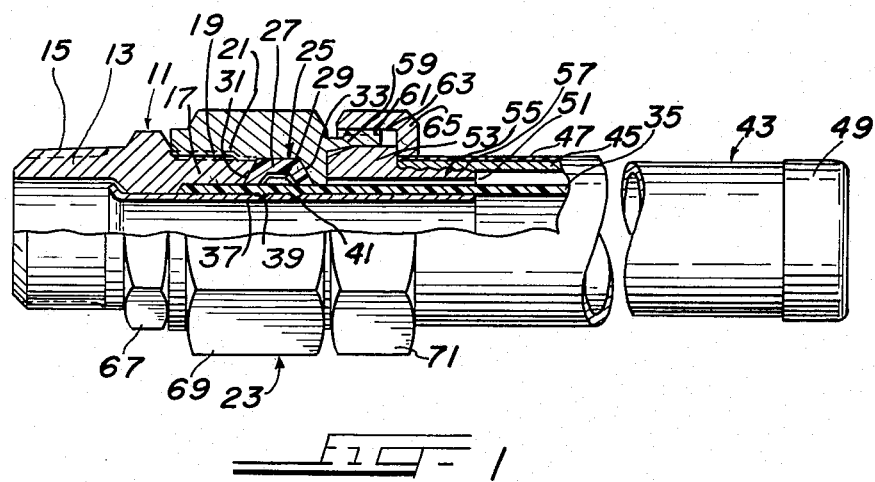
FIG. 1 is a plan view of the adapter of the present invention partially broken away to illustrate a cross section thereof.

An adapter constructed pursuant to the present invention is illustrated in FIG. 1. In this adapter, a joining arrangement includes the nipple 11, which has an extended portion 13 bearing threads 15. Although any appropriate type of arrangement could be utilized to join the adapter to a suitable conduit, in this particular embodiment the threads 15 are adapted to engage corresponding threads in a gas meter fitting (not shown). Also, in this environment, the adapter illustrated in FIG. 1 would be in a vertical position, with the threads 15 being inserted into a fitting at the bottom of a gas meter. The nipple 11 could be made of any suitable material, such as a hard steel, with dryseal threads 15 formed thereon.

On the other side of steel nipple 11, a compression flange 17 extends parallel to the axis of the adapter. The external surface of compression flange 17 bears threads 19, which are adapted to mate with threads 21 of a compression nut 23.

A compression member 25 includes a yieldable material 27 and a rigid holding member 29. The rigid holding member 29 is formed of a suitable strong material, while yieldable material 27 is a suitably deformable material, such as rubber. Upon mating of threads 19 and 21 of the compression flange 17 and compression nut 23, respectively, the tapered surfaces 31 of flange 17 and 33 of nut 23 compress the yieldable material 27 to force the rigid holding member 29 toward a flexible gas conveying line 35. A suitable stiffener 37 is located inside the flexible gas line 35 opposite the rigid holding member 29. As rigid holding member 29 is forced against the flexible gas line 35 by the mating of the threads of the compression flange 17 and the compression nut 23, the flexible gas line is forced into notches 39 and 41 formed in the stiffener 37. These notches 39 and 41 are suitably formed opposite the rigid holding member 29 to provide an effective lock or seal to retain the gas line 35 in the appropriate relationship to the gas meter.

To protect the flexible gas line 35, a tubular shield 43 is employed. Tubular shield 43 is a spirally formed or wound metal corrugated tubing that is formed to provide the desired protection, while also retaining the desired flexibility. A coating or layer 47 of a suitable plastic material, such as polyvinylchloride (PVC), is located over the corrugated metal tubing 45. As may be seen, the flexible gas line 35 extends through the tubular shield 43. At the end of the tubular shield 43 away from the adapter, a suitable plastic cap, through which the gas line 35 extends, is utilized to close the opening between tubular shield 43 and the flexible gas line 35.

In order to affix the spiral tubular shield 43 to the adapter, a linking member 51 is utilized. A relatively large head portion 53 is formed on linking member 51, together with an extending portion 55 that has threads 57 formed thereon. Threads 57 adapted to mate with the spirals of the spiral tubular shield 43. To enhance the bond between threads 57 of linking member 51 and the spirals of the tubular shield 43, an adhesive may be located therebetween. This adhesive is preferably a self-hardening adhesive that will form a permanent bond between the linking member and the tubular shield when it is hardened.

Fastening of the linking member 51 to the adapter is achieved by a connecting arrangement including a connecting flange 59 that extends from a side of the compression nut 23 opposite the compression flange 17. This connecting flange 59 bears threads 61 that are adapted to mate with thread 63 of a connecting nut 65.

The enlarged head portion 53 of linking member 51 is forcibly restrained between compression nut 23 and connecting nut 65, when threads 61 and 63 are mated.

As may be seen, the steel nipple 11, the compression nut 23 and the connecting nut 65 are all provided with external surfaces that are easily grasped by a tool, such as a wrench. These surfaces, 67, 69 and 71, respectively, may have a hexagonal or octagonal shape. After the threads 57 of the linking member 51 have been engaged with the spirals of the tubular shield 43, the compression nut 23 may be tightened to cause the flexible gas line to be forcibly engaged, and the connecting nut may be tightened to forcibly restrain the linking member 51 between compression nut 23 and connecting nut 65.

Figure 2:
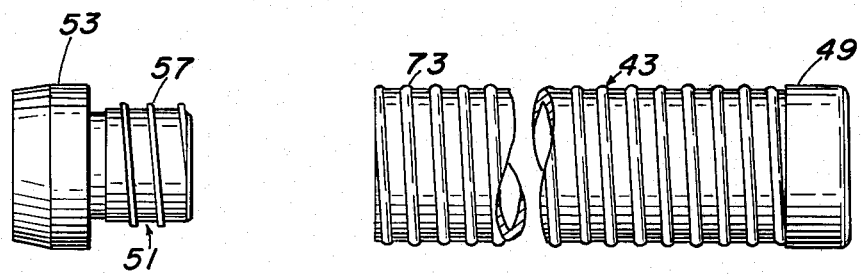
FIG. 2 is an enlarged view illustrating the linking member and spirally formed tubing of FIG. 1.

In FIG. 2, an enlarged view of the linking member 51 and the tubular shield 43 are illustrated. For ease of reference, tubular shield 43 is illustrated in this figure without the plastic coating 47, so that the spirals 73 may be more easily observed. It will be seen that the threads 57 of the linking member 51 are adapted to mate with the spirals 73 of the tubular shield 43, thus providing a strong bond between the shield and the linking member, which may be enhanced by the utilization of an appropriate adhesive.

Figure 3:
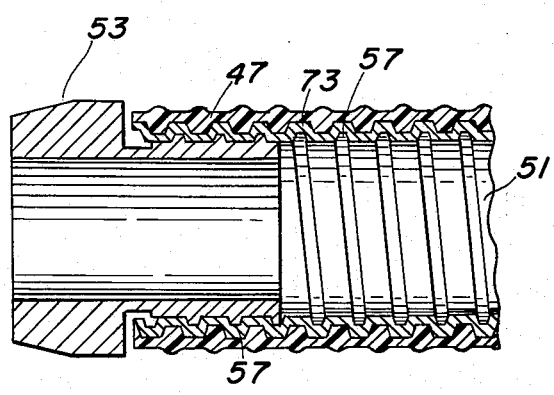
FIG. 3 is a further enlargement, partially in cross section, illustrating the engagement of the items in FIG. 2.

To further illustrate the invention, the further enlarged and partially broken away view of FIG. 3 demonstrates the mating of the threads 57 of linking member 51 with the spirals 73 of the tubular shield 43. The plastic coating is shown in somewhat exaggerated form for purposes of illustration.

It should be understood that various modifications, changes and variations may be made in the arrangements, operations and details of construction of the elements disclosed herein without departing from the spirit and scope of this invention.

I claim:

1. An adapter for connecting a flexible gas conveying line having a spirally formed tubular shield to a gas meter comprising:
   a nipple having threads for engagement with the gas meter;
   a compression flange extending from the side of said nipple away from the gas meter and having threads on the external surface thereof;
   a compression nut having threads to mate with the threads on said compression flange;
   a compression member forced into engagement with the flexible gas conveying line upon mating of the threads of said compression flange and said compression nut;
   a threaded connecting flange extending from the side of said compression nut away from said compression flange;
   a connecting nut having threads to mate with the threads of said connecting flange; and
   a linking member forcibly restrained upon mating of the threads of said connecting flange and said connecting nut, said linking member having threads formed thereon to engage the spirals of the tubing.

2. An adapter as claimed in claim 1 wherein said linking member has an enlarged head portion and a generally cylindrical extending portion having said threads formed thereon to engage the spirals of the tubing, said head portion being forcibly restrained between said compression nut and said connecting nut upon mating of the threads on said connecting flange and said connecting nut.

3. An adapter as claimed in claim 1 and further comprising an adhesive positioned between said threads on said linking member and the spirals of the tubing to form a permanent bond therebetween.

4. An adapter as claimed in claim 1 and further comprising a stiffener located inside the gas conveying member opposite said compression member.

5. An adapter as claimed in claim 4 wherein:
said compression member comprises a yieldable material and a rigid holding member to engage the gas conveying line; and
said stiffener has notches formed therein to receive said gas conveying line as urged by said holding member.

6. An adapter as claimed in claim 5 wherein:
said linking member has an enlarged head portion and a generally cylindrical extending portion having said threads formed thereon to engage the spirals of the tubing;
said head portion is forcibly restrained between said compression nut and said connecting nut upon mating of the threads on said connecting flange and said connecting nut; and
an adhesive is positioned between said threads on said linking member and the spirals of the tubing to form a permanent bond therebetween.

* * * * *